United States Patent
Shay et al.

(10) Patent No.: US 8,450,401 B2
(45) Date of Patent: May 28, 2013

(54) AQUEOUS COATING COMPOSITION HAVING REDUCED PLATE OUT

(75) Inventors: Gregory D. Shay, Cary, NC (US); Herbert F. Davis, Zebulon, NC (US); David J. Brennan, Midland, MI (US)

(73) Assignee: Arkema Inc., King of Prussia, PA (US)

( * ) Notice: Subject to any disclaimer, the term of this patent is extended or adjusted under 35 U.S.C. 154(b) by 9 days.

(21) Appl. No.: 12/449,445

(22) PCT Filed: Feb. 15, 2008

(86) PCT No.: PCT/US2008/002087
§ 371 (c)(1),
(2), (4) Date: Aug. 7, 2009

(87) PCT Pub. No.: WO2008/100608
PCT Pub. Date: Aug. 21, 2008

(65) Prior Publication Data
US 2010/0324169 A1    Dec. 23, 2010

Related U.S. Application Data

(60) Provisional application No. 60/901,356, filed on Feb. 15, 2007.

(51) Int. Cl.
C08K 5/34 (2006.01)
F21V 7/22 (2006.01)

(52) U.S. Cl.
USPC .......................................... 524/106; 523/172

(58) Field of Classification Search
USPC .......................................................... 524/106
See application file for complete search history.

(56) References Cited

U.S. PATENT DOCUMENTS

| | | | | |
|---|---|---|---|---|
| 4,902,734 A | * | 2/1990 | Dexter et al. | 524/91 |
| 5,661,196 A | * | 8/1997 | Mayer et al. | 523/122 |
| 5,731,262 A | * | 3/1998 | Ogino et al. | 503/207 |
| 6,075,079 A | * | 6/2000 | Helmer et al. | 524/253 |
| 6,645,552 B1 | * | 11/2003 | Schall et al. | 427/137 |
| 6,997,999 B2 | * | 2/2006 | Houston et al. | 156/51 |
| 2003/0213936 A1 | * | 11/2003 | Kubik et al. | 252/387 |
| 2006/0121289 A1 | * | 6/2006 | Robertson | 428/423.1 |
| 2007/0037723 A1 | * | 2/2007 | McDonnell et al. | 510/302 |

FOREIGN PATENT DOCUMENTS

| | | |
|---|---|---|
| DE | 103 32 152 A1 | 2/2005 |
| EP | 1 118 391 | 7/2001 |
| WO | WO 96/22338 | 7/1996 |

OTHER PUBLICATIONS

International Search Report and Written Opinion from PCT Application PCT/US2008/002087 dated Dec. 23, 2008 (19 pgs).

* cited by examiner

*Primary Examiner* — Hui Chin
(74) *Attorney, Agent, or Firm* — Lynn B. Morreale

(57) ABSTRACT

Fast hardening aqueous latexes and coating compositions, including paints such as traffic paints, comprising a triazole exhibit less plate out onto process metal surfaces compared to similar triazole-free compositions.

18 Claims, No Drawings

US 8,450,401 B2

AQUEOUS COATING COMPOSITION HAVING REDUCED PLATE OUT

This application is a National Stage application under 35 U.S.C. 371 of PCT/US2008/002087, and published as WO 2008/100608 on Aug. 21, 2008, which claims priority to U.S. Provisional Application Ser. No. 60/901,356 filed Feb. 15, 2007.

FIELD OF THE DISCLOSURE

The present disclosure relates generally to aqueous latex-containing compositions, such as a latex or a latex paint.

BACKGROUND

Fast hardening, also referred to as fast drying or quick setting, aqueous latex-based traffic paints are currently in wide use. One distinct advantage of these water-based paints is that they contain low amounts of volatile organic compounds compared to solvent based paints. However, the chemistry involved in the fast hardening mechanism of these paints can lead to situations in which the paint plates out on process surfaces, such as spray equipment. Traffic paint typically is applied as a spray from a moving vehicle. Plate out on process metal surfaces, such as the surfaces of the spray nozzle of the vehicle, can result in loss of productivity. Since the wide acceptance of aqueous traffic paints in the late 1980's, this problem has existed for traffic paint users, especially when using paints containing polyimine additives, such as polyethyleneimine, in combination with a metal process surface where the metal is not stainless steel.

It would be desirable to have an aqueous latex-containing composition, such as a traffic paint, in which the plate out problem would be substantially reduced.

SUMMARY

The present disclosure provides a fast hardening aqueous coating composition that includes an anionically stabilized aqueous dispersion of a copolymer, the copolymer having in polymerized form a polymerization mixture that includes two or more ethylenically unsaturated monomers wherein, based on the total weight of all ethylenically unsaturated monomers in the polymerization mixture, from 0 to about 4 weight percent of the monomers are alpha, beta-ethylenically unsaturated aliphatic carboxylic acid monomers; an effective amount of a polyimine having a molecular weight of from about 250 to about 20,000; an effective amount of a volatile base; and from about 0.01 to about 5 weight parts of a triazole, based on 100 weight parts solids of the copolymer of the anionically stabilized aqueous dispersion; where the composition has a pH of at least about 8, and where a cast film of the composition has a hardening rate measurement rating of at least five within 20 minutes after casting, measured at 25° C. and at a relative humidity of 50%.

Surprisingly, the composition of the present disclosure reduces the amount of plate out exhibited by compositions that are identical but for the triazole. Traffic latexes and traffic paints are among the fast-dry compositions that have a plating tendency and are improved with the compositions of the present disclosure.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list unless explicitly stated as such.

DEFINITIONS

For the purposes of the present disclosure, the term "copolymer" means a polymer derived from more than one species of monomer.

As used herein, "Tg" is an abbreviation for glass transition temperature.

As used herein "ml" is an abbreviation for milliliter(s).

As used herein "mm" is an abbreviation for millimeter(s).

As used herein "mil" is an abbreviation for a unit of length equal to 1/1000 of an inch.

As used herein "° C." is an abbreviation for degrees Celsius.

As used herein "g" is an abbreviation for gram(s).

As used herein, "aryl" refers to a compound whose molecules have the ring structure characteristic of benzene, naphthalene, phenanthrene, anthracene, etc. (i.e., either the 6-carbon ring of benzene or the condensed 6-carbon rings of the other aromatic derivative).

As used herein, "halogen" refers to one of the electronegative elements of group VIIA of the periodic table (fluorine, chlorine, bromine, iodine, etc.).

As used herein, "a," "an," "the," "at least one," and "one or more" are used interchangeably. The terms "comprises," "includes," and variations thereof do not have a limiting meaning where these terms appear in the description and claims. Thus, for example, a fast hardening aqueous coating composition that includes an anionically stabilized aqueous dispersion of "a" copolymer can be interpreted to mean that the anionically stabilized aqueous dispersion includes "one or more" copolymers.

Also herein, the recitations of numerical ranges by endpoints include all numbers subsumed within that range (e.g., 1 to 5 includes 1, 1.5, 2, 2.75, 3, 3.80, 4, 5, etc.).

For the purposes of the present disclosure, the term "dry" means in the substantial absence of water.

For the purposes of the present disclosure, the term "room temperature" means 20° C. to 25° C.

As used herein, the term "process metal surface" means a metal surface that the composition comes into contact with during use or preparation.

As used herein, the term "triazole" includes the compound in salt and/or non-salt form.

DETAILED DESCRIPTION

The compositions of the present disclosure can include an aqueous latex, a volatile base, a polyimine and/or a polyamine, and a triazole. A triazole is added to the compositions of the present disclosure in an amount that is sufficient to lessen the amount of plate out onto a process metal surface as determined by the Plate Out Test described herein. Advantageously, the amount of triazole employed is from about 0.01 to about 5 weight parts, based on 100 weight parts solids of the copolymer of the anionically stabilized aqueous dispersion, preferably is from about 0.1 to about 3 parts, and more preferably is from about 0.25 to about 1.5 parts.

In one embodiment of the disclosure, the triazole comprises a compound of the structure:

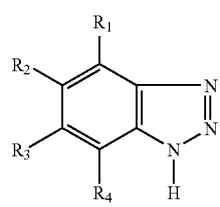

wherein $R_1$, $R_2$, $R_3$ and $R_4$ are independently selected from hydrogen, alkyl, aryl, halogen, amino, alkylamino, dialkylamino, hydroxyl, nitro, acetamido, trifluoromethyl, sulfonic acid, and cyano.

Examples of suitable triazoles include benzotriazole, 5-methyl-1H-benzotriazole (tolyltriazole), 7-acetamido-5-methyl-1,2,3-benzotriazole, 5-acetamido-5-methyl-1,2,3-benzotriazole, 5-amino-6-methyl-1,2,3-benzotriazole, 7-amino-5-methyl-1,2,3-benzotriazole, 6-methyl-4-nitro-1,2,3-benzotriazole, 4,6-dimethylbenzotriazole, 5-butyl-4-nitro-1H-benzotriazole, 4-chloro-5-methyl-1H-benzotriazole, 5-chloro-6-methyl-1H-benzotriazole, 7-hydroxy-5-methyl-1H-benzotriazole-4,6-dicarbonitrile, 5-hexyl-1H-benzotriazole, 5-methyl-1H-benzotriazole-4-amine, 6-methyl-1H-benzotriazole-5-ol, 5-ethyl-6-nitro-1H-benzotriazole, 5-methyl-6-nitro-1H-benzotriazole, 4-bromo-5,6-dimethyl-1H-benzotriazole, 5-ethenyl-1H-benzotriazole, 4,5,6,7-tetramethyl-1H-benzotriazole, 5-(1,1,4-trimethylpentyl)-1H-benzotriazole, 5-(1,1-dimethylpropyl)-1H-benzotriazole, 5-(1,1,3,3-tetramethylbutyl)-1H-benzotriazole, 5-(1,1-dimethylethyl)-1H-benzotriazole, 5-octyl-1H-benzotriazole, 4,5-dimethyl-1H-benzotriazole, 5-chloro-6-methyl-4-nitro-1H-benzotriazole, 5,6-dimethyl-4-nitro-1H-benzotriazole, 5-methyl-4,6-dinitro-1H-benzotriazole, 5-methyl-4-nitro-1H-benzotriazole, 5-methyl-4-trifluoromethyl-1H-benzotriazole, 5-methyl-6-trifluoromethyl-1H-benzotriazole, 5-butyl-1H-benzotriazole-4-ol, 5-methyl-1H-benzotriazole-4-ol, 5,6-dimethyl-1H-benzotriazole, 5-ethyl-1H-benzotriazole, 5-dodecyl-1H-benzotriazole, and 5-butyl-1H-benzotriazole, with benzotriazole and tolyltriazole being preferred examples. Mixtures of triazoles can be employed.

It is understood that the triazole may be present in the neutral form or salt form, and that these forms are readily interconvertible by well known simple procedures. The triazole can be employed either in salt form or non-salt form, or as a mixture of both. In one embodiment, the composition in which the triazole is employed may have a pH of over 7, and in such a situation at least part of the triazole may be in salt form, e.g. the sodium or ammonium salt of the triazole. Accordingly, as used herein, the term "triazole" includes the compound in salt and/or non-salt form.

The compositions of the present disclosure also include at least one synthetic latex. A synthetic latex, as is well known, is an aqueous dispersion of polymer particles prepared by emulsion polymerization of one or more monomers. The latex can have a monomodal or polymodal, e.g. bimodal, particle size distribution. Latexes used in fast hardening applications are well known to those skilled in the art, and many of such latexes are commercially available. Mixtures or blends of latexes can be employed.

In one embodiment of the present disclosure, the polymer of the latex is a copolymer. The latex may contain a single copolymer or more than one copolymer. Advantageously, the polymer of the latex has a glass transition temperature (Tg) of from about −50° C. to about 100° C.

The copolymers that are useful alone, as opposed to those useful only in a blend, in the practice of the present disclosure desirably have a Tg of no lower than about −10° C., preferably at least about 0° C. Desirably, the Tg of the copolymer is no higher than about 50° C., preferably up to about 40° C. The generally preferred range is from about 0° C. to about 40° C. The Tg of the copolymer of the composition of the disclosure can be determined by differential scanning calorimetry (DSC).

While a wide range of monomeric compositions are useful for the copolymeric component of the fast hardening aqueous coating composition of the disclosure, in a particular embodiment it is preferred that the copolymer is uncrosslinked by virtue of there being no crosslinking monomers present in the group of ethylenically unsaturated monomers present in the polymerization mixture from which it is prepared. That is, it is desirable in this embodiment that the copolymer be produced by polymerization in the absence of crosslinking monomers or some other crosslinking agent. It is also preferable in this embodiment that there be no other source of covalent crosslinking in the fast hardening aqueous coating composition.

In alternative embodiments, it can be desirable for the copolymer to be lightly crosslinked. This may be accomplished by the inclusion in the polymerization mixture from which the copolymer is prepared of a monomer that is multifunctional and of known utility as a crosslinker, such as, for example, divinyl benzene or allyl (meth)acrylate. In this particular embodiment, it is preferred that the content of crosslinking monomers in the copolymer is no more than about 2 weight percent, preferably from 0.001 to 2 weight percent, more preferably from 0.01 to 1.5 weight percent, still more preferably from 0.1 to 1 weight percent, where the weight percentages are based on the total weight of monomers in the polymerization mixture.

A wide variety of monomers may be used to prepare copolymers suitable for use in the compositions of the present disclosure. (Meth)acrylate copolymers comprising primarily (meth)acrylate monomers are one desirable type of copolymer. For the purposes of the present disclosure, the term "(meth)" indicates that the methyl substituted compound is included in the class of compounds modified by that term. For example, the term (meth)acrylic acid represents acrylic acid and methacrylic acid.

As used herein the term "(meth)acrylate copolymer" means a copolymer that contains in polymerized form at least 80 weight percent (meth)acrylate monomers and (meth)acrylic acid monomers, where the weight percentage is based on the total weight of monomers in the polymerization mixture. In a preferred embodiment, the copolymer contains in polymerized form at least 90 weight percent (meth)acrylate monomers and (meth)acrylic acid monomers, while even more preferred is the embodiment wherein the copolymer contains in polymerized form at least 95 weight percent (meth)acrylate monomers and (meth)acrylic acid monomers.

In a highly preferred embodiment, the copolymer is a pure (meth)acrylate, or a pure (meth)acrylate except for the inclusion of a non-(meth)acrylate seed therein. These copolymers desirably consist essentially of (meth)acrylate monomers, or of (meth)acrylate monomers and (meth)acrylic acid monomers.

The term "(meth)acrylate monomers" is meant to include those monomers that are used to prepare the (meth)acrylate copolymers that are suitable for use in the compositions of this disclosure. Included therein are conventionally known acrylates, such as, for example, alkyl esters of acrylic acid, represented by the formula $CH_2\!=\!CHCOOR$, and methacrylic acid, represented by the formula $CH_2\!=\!CCH_3COOR$, where R is a hydrocarbyl or a substituted hydrocarbyl group containing from 1 to 16 carbon atoms. The term "(meth) acrylic acid monomers" is meant to include acrylic acid, methacrylic acid and substituted derivatives thereof.

The term "(meth)acrylate monomers" as used herein is meant also to include the monovinyl acrylate and methacrylate monomers. The (meth)acrylates can include esters, amides and substituted derivatives thereof. Generally, the preferred (meth)acrylates are $C_1$-$C_8$ alkyl acrylates and methacrylates.

Examples of suitable (meth)acrylates include methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

Monomers suitable for use as components in polymers can be classified as "hard" or "soft" monomers, depending upon the glass transition temperature (Tg) of the homopolymer prepared from the monomer. As used herein, a hard monomer is characterized as having a Tg greater than 40° C. for its homopolymer, while a soft monomer is characterized as having a Tg of 40° C. or less for its homopolymer. A preferred hard (meth)acrylate monomer is methyl methacrylate.

The soft non-functional (meth)acrylate monomers have the formula:

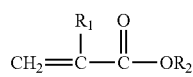

wherein $R_1$ is selected from the group consisting of hydrogen and methyl, and $R_2$ is an alkyl group, preferably having up to about 15 carbon atoms. As used in the specification and claims, the term "alkyl" means cyclic and acyclic saturated hydrocarbon groups that can be either branched or unbranched. Exemplary soft, non-functional acrylic monomers include, but are not limited to, butyl acrylate, isobutyl acrylate, ethylhexyl acrylate, isodecyl methacrylate, lauryl methacrylate, tridecylmethacrylate. Butyl acrylate is a preferred soft, non-functional monomer.

Suitable non-ester monomers that are sometimes classified with the (meth)acrylates are the nitriles. A preferred nitrile monomer is acrylonitrile.

While a more highly preferred embodiment of the (meth) acrylate copolymer of the instant disclosure may contain up to about 5 weight percent of other comonomers that are not (meth)acrylate monomers, where the weight percentage is based on the total weight of monomers in the polymerization mixture, other embodiments may contain as other comonomers as much as 10 weight percent or even as much as 20 weight percent of monomers that are not (meth)acrylate monomers. Other monomers that are useful in these copolymers of the instant disclosure include vinyl aromatic monomers, aliphatic conjugated diene monomers, monoethylenically unsaturated carboxylic acid monomers, vinyl acetate monomer, vinylidene halide monomer and vinyl halide monomer. In some other desirable copolymers suitable for use in the present disclosure, the monomers of the polymerization mixture include from about 1 to about 40 weight percent of one or more (meth)acrylate monomers.

As used herein, "vinyl aromatic monomers" are defined as an organic compound containing at least one aromatic ring and at least one aliphatic-containing moiety having vinyl unsaturation; provided, however that this term is not intended to cover any triazole. Illustrative vinyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. The preferred vinyl aromatic monomers are styrene and vinyltoluene; and due to its commercial availability and low cost, styrene is the more preferred vinyl aromatic monomer.

The term "conjugated diene monomer", as used herein, is meant to include compounds such as 1,3-butadiene, isoprene, 1,3-pentadiene, 2-ethyl-1,3-butadiene, and 4-methyl-1,3-pentadiene, 2-methyl-1,3-butadiene, piperylene (1,3-pentadiene), and other hydrocarbon analogs of 1,3-butadiene. The preferred alkadiene monomer is 1,3-butadiene. Other monomers inclusive as aliphatic conjugated dienes are halogenated compounds, such as, for example, 2-chloro-1,3-butadiene.

The monomers of the vinyl group, such as, for example, "vinylidene halides" and "vinyl halides", are suitable for inclusion in the copolymer of this disclosure, and include, for example, vinylidene chloride and vinyl chloride, which are highly preferred. Vinylidene bromides and vinyl bromide can also be employed. Another vinyl monomer within the vinyl group is vinyl acetate.

Suitable alpha, beta-ethylenically unsaturated aliphatic carboxylic acid monomers are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents a cation such as ammonium, hydrogen or a metal such as, for example, sodium or potassium) and are readily interconvertible by well known simple procedures.

Specific examples of the alpha, beta-ethylenically unsaturated aliphatic carboxylic acids are acrylic acid, methacrylic acid, fumaric acid, itaconic acid, maleic acid, aconitic acid, various alpha-substituted acrylic acids such as alpha-ethacrylic acid, alpha-propyl acrylic acid and alpha-butyl acrylic acid. Highly preferred acid monomers are acrylic acid and methacrylic acid.

With regard to the amount of acid monomer that is desirable or preferred in the copolymer as discussed above, it appears that there is a trade-off in terms of the acid strength of the monomer as indicated by pKa in aqueous solution and the amount of the acid monomer desirably included in the copolymer. While a higher acid content can be tolerated and may be desirable for relatively weak acid monomers, for those acid monomers that are relatively stronger acid monomers, the acid content of the copolymer is desirably less.

While a wide range of monomeric compositions are useful for the copolymeric component of the fast hardening aqueous coating composition of this disclosure, in a particular embodiment it is preferred that the content of alpha, beta-ethylenically unsaturated aliphatic carboxylic acid monomers in the copolymer is no more than about 5 weight percent, desirably up to about 4 weight percent, more desirably up to about 3 weight percent, preferably up to about 2 weight percent, and more preferably up to about 1 weight percent, where the weight percentage is based on the total weight of monomers in the polymerization mixture.

When present, the content of alpha, beta-ethylenically unsaturated aliphatic carboxylic acid monomers in the copolymer is desirably at least about 0.2 weight percent, more desirably at least about 0.3 weight percent, preferably at least about 0.4 weight percent, and more preferably at least about 0.5 weight percent, where the weight percentage is based on the total weight of monomers in the polymerization mixture.

In some preferred embodiments, the content of alpha, beta-ethylenically unsaturated aliphatic carboxylic acid monomers in the copolymer is desirably in the range from 0 to about 4 weight percent, more preferably from about 0.2 to about 3 weight percent, still more preferably from about 0.3 to about 2 weight percent, still more preferably from about 0.4 to about 1 weight percent, where the weight percentages are based on the total weight of monomers in the polymerization mixture. In a highly preferred embodiment of this disclosure, the copolymer either contains no alpha, beta-ethylenically unsaturated aliphatic carboxylic acid monomers or is very low therein, generally in the range from 0 to about 0.5 weight percent.

In a desirable embodiment of the present disclosure, the copolymer of the fast hardening aqueous coating composition is non-carboxylated. In a preferred aspect of this embodiment, the copolymer consists essentially of (meth)acrylate monomers.

Within the scope of this disclosure are other embodiments wherein the copolymer utilized would not be classified as a (meth)acrylate copolymer. Other copolymer types that can be utilized include, for example, combinations of vinyl aromatic monomers with (meth)acrylate monomers, such as, for example, the styrene acrylates, and of vinyl aromatic monomers with conjugated diene monomers, such as, for example, styrene butadiene copolymers. These copolymers may be non-carboxylated or carboxylated.

In one embodiment of this disclosure, the aqueous coating composition comprises an anionically stabilized aqueous dispersion of a copolymer comprising in polymerized form a polymerization mixture, where the monomers of the polymerization mixture include from about 1 to 100 weight percent of one or more (meth)acrylate monomers, from about 0.1 to about 4 weight percent of one or more (meth)acrylic acid monomers, from about 1 to 100 weight percent of one or more ethylenically unsaturated monomers that are not (meth)acrylate monomers or alpha, beta-ethylenically unsaturated aliphatic carboxylic acid monomers, from about 0.1 to 4 weight percent of one or more alpha, beta-ethylenically unsaturated aliphatic carboxylic acid monomers that are not (meth)acrylic acid monomers, or a mixture thereof. Another preferred embodiment of the fast hardening aqueous coating composition includes an anionically stabilized aqueous dispersion of a copolymer, with the copolymer having in polymerized form a polymerization mixture containing two or more ethylenically unsaturated monomers where, based on the total weight of all ethylenically unsaturated monomers in the polymerization mixture, from 0 to about 4 weight percent of the monomers are alpha, beta-ethylenically unsaturated aliphatic carboxylic acid monomers.

A particularly desirable polymer with a preferred Tg for use in the compositions of the present disclosure can be obtained from the polymerization of the monomers of a polymerization mixture where the polymerized mixture, based on 100 parts by dry weight of the monomers polymerized, comprises from about 30 to about 60 percent of a soft monomer, such as, for example, butyl acrylate, ethylhexyl acrylate, butadiene or a mixture thereof, and from about 40 to about 70 percent, based on 100 parts by dry weight of the monomers polymerized, of a hard monomer, such as, for example, methyl methacrylate, styrene or a mixture thereof. Desirably, a soft monomer whose homopolymer has a Tg of less than about −20° C. is copolymerized with a hard monomer whose homopolymer has a Tg of greater than about 80° C.

The copolymer desirably can be made, for example, by charging the monomeric ingredients, water, and a surfactant (when employed) into a reaction vessel, purging the reaction vessel with an inert gas, such as, for example, nitrogen, to remove essentially all the oxygen from the reactor vessel, and heating the reactor vessel to the reaction temperature, usually from about 80° C. to about 100° C. When the reactor vessel reaches the desired reaction temperature, an initiator is then added to the reaction vessel, and the reaction is continued for about 2 hours to about 4 hours. After the reaction has continued, the reactor vessel is cooled. This synthesis yields an aqueous copolymeric composition comprising the copolymer in water. In some instances, the composition can have the appearance of a milky liquid, while in other instances the composition can have the appearance of a clear solution.

The process of producing the copolymer may include the use of a seed, which may be a (meth)acrylate, polystyrene or any other seed useful to control the ultimate particle size of the copolymer produced, or otherwise useful in the production thereof. As is well known in the art, the regulation of initial seed can be used to control the range of particle sizes of the copolymer produced. Useful copolymer particle sizes are in the range of from about 700 angstroms to about 10,000 angstroms.

Anionic, nonionic, and amphoteric surface active compounds, also referred to as surfactants, can be employed in the copolymer synthesis process. However, in some instances, no surfactant is used. Exemplary anionic, nonionic, and amphoteric surfactants are SIPONATE A246L brand surfactant available from Rhone-Poulenc, polyoxyethylene alkyl phenol surfactants, and N,N-bis-carboxyethyl lauramine, respectively. Another useful surfactant is DOWFAX 2EP, the sodium salt of dodecylated sulfonated phenyl ether, which is available from The Dow Chemical Company, Midland, Mich. 48640, U.S.A.

Preferred classes of surface active compounds are those in which the cation is derived from a volatile base, rather than a fixed base, such as, for example, the ammonium salt of dodecylated sulfonated phenyl ether. Generally, when a surface active compound is included, it is desirable that the fast hardening aqueous coating composition contain from 0 to no more than about 1 weight percent of one or more surface active compounds, and preferably it contains from about 0.1 to about 0.5 weight percent of one or more surface active compounds, where the weight percentages are based on the total weight of monomers in the polymerization mixture.

Typical initiators include thermally generated free radical sources such as peroxydisulfates, known in the industry as persulfates, perphosphates, and hydrogen peroxide. Generally, the initiator is employed in a concentration of about 0.1 to about 2 parts per hundred parts monomer by weight (phm), and preferably in a concentration of about 0.25 to about 1.0 plum A preferred class of initiators are those in which the cation, if present, is derived from a volatile base, such as, for example, ammonium peroxydisulfate.

As with the surfactants and initiators, when in particular emulsion polymerization systems, it is desirable to include therein various other emulsion polymer formulation components, the preferred classes of these components will be those that do not increase the non-volatile salt load of the final composition. The term "non-volatile salt load" means those ionic components whose cation is not a volatile base-containing cation, such as, for example, sodium ion or potassium ion. Volatile base-containing cations are preferred as constituents of ionic components for use in the fast hardening aqueous coating compositions of this disclosure. It is desirable that the non-volatile salt load of the fast hardening aqueous coating composition is no more than 2 weight percent, more desirable that it is no more than 1.5 weight percent, and preferable that it is from 0 to no more than about 1 weight percent, where the weight percentage is based on the total weight of monomers in the polymerization mixture.

Other components that may be useful in some compositions include dispersants, thickeners, defoamers, biocides, flame retardants, antioxidants, and UV stabilizers. In one embodiment of the disclosure, these components are essentially free of triazoles.

The dispersion of the present disclosure may also be made, for example, by a delayed addition polymerization process. Typically, the delayed addition polymerization process includes forming a monomer mixture containing about 20 to about 80 weight percent soft monomer, about 20 to about 80 weight percent hard monomer, and 0 to about 5 weight percent olefinic carboxylic acid monomer.

Water is added to a reactor and heated, generally to about 70° C. to about 90° C., while preferably purging the reactor with an inert gas, such as nitrogen, to remove substantially all oxygen from the reactor. A catalyst is then added to the reactor. Preferably, a locus for polymerization, that is, a surfactant and/or a surfactant containing seed is added to the reactor before, simultaneously with, or after the catalyst addition to form a reactor charge. After the addition of the catalyst and locus for polymerization, the delayed addition of the monomer mixture is then commenced. The ensuing reaction form one example of the dispersion of the present disclosure. The addition of the monomer mixture typically takes up to about 4 hours. During the delayed addition of the monomer mixture, additional catalyst is typically also added to the reactor contents.

In an alternative synthesis procedure, a portion, for example up to about one half of the monomer mixture, is added to the reactor at the beginning of the reaction along with the addition of the initial catalyst and/or seed and/or surfactant.

After the monomer mixture addition is completed, further catalyst is commonly added while maintaining the emulsion at the elevated reaction temperature to ensure that substantially all of the monomers polymerize. The same catalyst can be used whenever one is employed. Exemplary catalysts include, but are not limited to, t-butyl hydroperoxide, ammonium persulfate, hydrogen peroxide, and mixtures thereof.

In order to stabilize the emulsion, typically toward the end of the monomer mixture addition, the pH of the emulsion is adjusted to a value greater than about pH 7. Adjusting the pH to within the range from about pH 7 to about pH 11 substantially neutralizes the olefinic carboxylic acid groups on the polymer.

The pH of the emulsion advantageously may be adjusted from about 30 minutes before to about 30 minutes after completing the addition of the monomer mixture. Desirably, the pH adjustment occurs within about 15 minutes after completing the monomer mixture addition. Alternatively, the dispersion may be allowed to cool to ambient or room temperature after all the monomer mixture and catalyst have been added. Then, the pH of the cooled dispersion is adjusted. Typically, a volatile base is employed in each instance where the pH of the dispersion is adjusted.

The term "volatile base" as used herein is meant to include an organic or inorganic compound that is a weak or strong base and that has a sufficiently high vapor pressure allowing it to evaporate or otherwise volatilize out of the aqueous compositions, which are embodiments of this disclosure so that a pigment-containing formulation prepared from the composition has a no pick up time according to ASTM D711 of 20 minutes or less, or, in the case of a pigment-free fast hardening aqueous coating composition, so that a cast film of the composition has a hardening rate measurement rating of at least 5 within 20 minutes, measured according to the hardening rate measurement rating test described hereinbelow, with such results occurring by employing an effective amount of volatile base.

For the various embodiments; it is advantageous to use the volatile base component of the composition to accomplish this pH adjustment. Typically, this will require adding an amount of volatile base that is at least about 0.2 weight percent based on 100 weight parts solids of the copolymer of the finished fast hardening aqueous coating composition. Preferably, the amount of volatile base added is at least about 0.3 weight percent, and in some cases it is preferable that the amount be at least about 0.5 weight percent. Advantageously, no more than about 5 weight percent of a volatile base, based on 100 weight parts dry solids of the copolymer of the anionically stabilized aqueous dispersion, is added. It is preferable that the amount of volatile base be about 3 weight percent or less, more preferably 2 weight percent or less, even more preferably 1.5 weight percent or less. It is desirable for the finished composition to contain an amount of volatile base that is from about 0.2 to about 5 weight percent of the finished composition, based on 100 weight parts solids of the copolymer. More desirably, the amount of volatile base will be 0.2 to about 3 weight percent of the finished composition, based on 100 weight parts solids of the copolymer of the anionically stabilized aqueous dispersion, preferably from about 0.2 to about 2 weight percent, more preferably 0.3 to about 1.5 weight percent.

Exemplary volatile bases are selected from the group consisting of amine containing bases, hydroxide-containing bases, and mixtures thereof. Dimethylamine, diethylamine, aminopropanol, ammonium hydroxide, and 2-amino-2-methyl-1-propanol are typical bases, with the more volatile bases being more desirable, and ammonium hydroxide being preferred. In a preferred embodiment, the composition comprises from about 0.3 to about 2.0 weight percent of a volatile base, based on 100 weight parts solids of the copolymer.

In another embodiment, in which it is desirable to have a minimal volatile base content, a limited amount of a fixed based may be used in the composition, which is generally from about 0.1 to about 1.0 weight percent, based on 100 weight parts of dry copolymer solids of the anionically stabilized aqueous dispersion of the composition, and preferably from about 0.1 to about 0.7 weight percent, based on 100 weight parts of dry copolymer solids of the anionically stabilized aqueous dispersion of the composition. This may be accomplished through the addition of a fixed base in the polymerization process or the neutralization process, or as a result of the use of some polymerization component in salt form in which the cation is not volatile, such as, for example, the sodium salt of an anionic surfactant, followed after polymerization by pH adjustment with a volatile base. Desirable fixed bases for use in embodiments of the present disclosure include sodium and potassium hydroxides, sodium hydroxide being preferred.

When a fixed base is used in the composition, the amount of the volatile base used generally is reduced from what it would be otherwise, typically, to about 2 weight percent, based on 100 weight parts of dry copolymer solids of the anionically stabilized aqueous dispersion of the composition, or less, preferably about 1.5 weight percent or less, more preferably about 1 weight percent or less.

In some cases the relatively strong odor of ammonia associated with a composition containing a relatively high concentration of ammonia may be undesirable. In this circumstance, it may be possible to reduce the ammonia content by using a volatile base component that is a mixture of volatile bases, such as, for example, a mixture of ammonium hydroxide (ammonia) and a less volatile organic base, such as, for example, aminomethylpropanol.

Typically, the organic base of the mixed volatile base would be at least about 0.25 weight percent, desirably up to about 0.5 weight percent, but probably not more than about 1 weight percent. As with the addition of small amounts of fixed base containing compositions, those compositions with a mixed volatile base generally would employ a lesser amount of ammonium hydroxide than if it were the sole base, typically, about 2 weight percent, based on 100 weight parts of dry copolymer solids of component of the composition, or less, preferably about 1.5 weight percent or less, more preferably about 1 weight percent or less.

The addition of the volatile base component as described above generally results in an increase in the pH of composition sufficient that the pH of the finished fast hardening aqueous coating composition has a pH that is at least about pH 8, desirably at least about pH 9, preferably at least about pH 9.5, and more preferably at least about pH 9.8. It is not necessary, and generally is not desirable, for the pH of the composition to be greater than about pH 12, and, advantageously pH of the composition is about pH 11 or less, preferably, the pH of the composition is about pH 10.8 or less, more preferably, about pH 10.5 or less. Thus, the desirable pH range for the finished aqueous coating compositions, including the fast hardening aqueous coating compositions, is from about pH 8 to about pH 12, more desirably from about pH 9.5 to about pH 10.8 or pH 11, and preferably from about pH 9.8 to about pH 10.5.

The polymerization process yields a preferred embodiment of the aqueous dispersion of the present disclosure. For the various embodiments, the pH adjustment can provide the anionically stabilized aqueous dispersion of copolymer that is to be included in the fast hardening aqueous coating composition, along with the addition of a third component that is preferably a polyimine and/or a polyamine. The solids content of the dispersion is generally at least about 40 weight percent based on total aqueous dispersion, preferably in the range of about 45 to about 70 weight percent, and more preferably in the range of from about 45 to about 60 weight percent. These numbers are not greatly affected by the addition of the polyimine and/or the polyamine, since it typically is added as an aqueous solution, about 50 weight percent of which is the polyimine and/or the polyamine.

Suitable latexes can be produced using conventional emulsion polymerization techniques. Thus, for example, the monomers to be employed in the particular latex involved are typically dispersed, with agitation sufficient to emulsify the mixture, in an aqueous medium that may contain known emulsifying agents such as a surfactant as well as other ingredients conventionally employed in the art as polymerization aids, including a conventional chain transfer agent. Such monomers are then subjected to polymerization with the aid of a conventional source for generating free radicals, including conventional free radical polymerization catalysts, activating radiation, or other means.

Free radical polymerization catalysts suitable for use in the foregoing polymerizations include those already known to promote emulsion polymerization. Among such catalysts are oxidizing agents such as organic peroxides such as t-butyl hydroperoxide, and cumene hydroperoxide inorganic oxidizing agents such as hydrogen peroxide, potassium persulfate, sodium persulfate, ammonium persulfate and catalysts that, like redox catalysts, are activated in the water phase, for example, by a water-soluble reducing agent.

Such catalysts can be employed in an amount sufficient to cause polymerization, that is, in a catalytic amount. Generally, an amount ranging from about 0.01 to about 5 weight percent based upon the total monomer to be polymerized is sufficient. Alternatively, other free radical producing means, such as exposure to activating radiations, can be employed rather than heat and/or catalytic compounds to activate the polymerization.

Suitable emulsifying agents that can be employed include the anionic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali, metal alkyl sulfates, the sulfonate alkyl esters, the fatty acid soaps, and the like. Specific examples of known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate, and dioctyl sodium sulfosuccinate, and, preferably, the corresponding ammonium salt forms. Such emulsifying agents can be employed in varying amounts so long as adequate emulsification is achieved to provide dispersed polymer particles having the desired particle size and particle size distribution. However, generally an amount ranging from about 0.01 to about 5 weight percent, based upon the total monomer to be polymerized is advantageously employed.

Conventional chain transfer agents can also be employed in the production of latexes and, in polymerization stages employing an aliphatic conjugated diene, it is preferable to do so. Examples of such long chain mercaptans are, for example, lauryl mercaptan, dodecyl mercaptan, and other known chain transfer agents.

Other ingredients known in the art to be useful for various specific purposes in emulsion polymerization can also be employed in the aforementioned latexes. For example, when the polymerizable constituents for a given latex include a monoethylenically unsaturated carboxylic acid monomer, polymerization under acidic conditions, that is the aqueous media having pH value of from about pH 2 to about pH 7, especially from about pH 2 to about pH 5, which is preferred. In such instances, the aqueous medium can include acids and/or salts to provide the desired pH value and possibly a buffered system.

The latexes can be prepared by conventional emulsion polymerization techniques. For example, in one embodiment of the present disclosure, water and a seed latex or a micelle-forming surfactant are introduced into a reactor equipped with pumps to deliver monomer and aqueous feeds. The reactor is purged with nitrogen and heated. Over a period of several hours, the monomer streams are added as well as a stream containing water, aqueous surfactant, and polymerization initiator. Following the addition of the monomer streams and the aqueous streams, the reaction mixture is maintained at the reaction temperature for additional reaction time to facilitate more complete reaction before cooling. The latex then may be steam distilled to reduce the concentration of residual monomers.

For more information related to the production of copolymer-containing synthetic latex compositions and formulations see "Emulsions: Theory and Practice," by P. Becher Reinhold, N.Y. (1959), "High Polymer Latices," by D.C. Blackley, Palmerton Publishing Co., New York (1966), and "Emulsion Polymer Technology," by Robert D. Athey, Jr., Marcel Dekker, Inc. New York (1991).

Numerous other copolymers and copolymer-containing latexes, known in the art, can be utilized in the compositions of the present disclosure. Examples include those discussed in U.S. Pat. Nos. 6,075,079; 5,201,948; 5,213,901; 5,198,492; 5,185,396; 5,182,327; 5,173,534; 5,212,251; 5,059,456; 4,293,476; 4,666,777; 4,658,003; 4,742,108; 4,644,032; 4,623,678; 4,087,572; 4,012,355; 5,236,991; 5,157,084; 5,045,576; 4,973,670; 4,972,018; 4,968,740; 4,962,154; 4,863,979; 4,857,631; 4,806,207; 4,508,869; 4,733,005; and 4,707,221; all of which are hereby incorporated by reference.

While the compositions of the present disclosure can include a copolymer, where for some compositions a single copolymer can be used, it is within the scope of the present disclosure to employ blends of copolymers along with the other elements of the composition. For example, one preferred embodiment of the present disclosure includes a single copolymer along with the other elements of the composition.

When a blend of copolymers is employed rather than a single copolymer, it is desirable for one or more of the copolymers of the blend to be capable of film formation at ambient temperatures, while one or more other copolymers of the blend may be harder, that is, the Tg's of the non-film forming copolymers may be greater than about 40° C. For this component of the blend, it is possible for the Tg to be up to 50° C., to be up to 60° C., to be up to 70° C., to be up to 80° C., to be up to 90° C., to be up to 100° C., or up to 130° C.

Polyimines are polymers produced by the polymerization of imine monomers that do not contain carbon-carbon ethylenic unsaturation, but, rather, contain either carbon-nitrogen unsaturation or exist as heterocyclic ring compounds. As a result, polyimines have nitrogen atoms in the polymer backbone. Depending upon the pH of the system, these nitrogen atoms in the backbone of the polymer may be protonated, just as would the nitrogen atom of an amine group attached to a polymer. However, because of the placement of the nitrogen atom in the polymer backbone, there are significant differences from pendant amine chemistry.

The polyimine is employed in an effective amount sufficient to result in a fast hardening aqueous coating composition of the present disclosure. In one embodiment, the effective amount of polyimine employed advantageously is from about 0.2 to about 5 weight parts, based on 100 weight parts of copolymer solids of the anionically stabilized aqueous dispersion, preferably is from about 0.3 to 3 parts, and more preferably is from about 0.5 to about 2 parts.

Suitable polyimines for use in the fast hardening aqueous coating composition of the disclosure include, for example, polyethylenimines and polypropylenimines, desirably with a molecular weight of at least about 250, preferably with a molecular weight of at least about 400, more preferably with a molecular weight of at least about 700. When lower molecular weight polyimines are used as constituents of the fast hardening composition, the rate of hardening is reduced.

The molecular weight of the polyimine should be no greater than about 20,000, desirably, no greater than about 10,000, more desirably no greater than about 5,000, preferably no greater than 3,000, and more preferably no greater than about 2,000. When higher molecular weight polyimines are used as constituents of the fast hardening composition, the viscosity of the composition is increased and the compositions are more difficult to use.

Preferred ranges for the molecular weight of the polyimine component of the composition are from about 250 to about 20,000, desirably from about 400 to about 10,000, more desirably from about 400 to about 3,000, and preferably from about 700 to about 2,000.

Preferred polyimines for use in embodiments of the composition of the instant disclosure include polyethylenimine (PEI) that has an average molecular weight of about 2,000. The material is available from BASF as LUPASOL G-35, CAS No. 9002-98-6. Other commercially available PEI's include LUPASOL FG with an average molecular weight of about 800, and LUPASOL G-20 with a molecular weight of about 1,300. Generally, the molecular weights of the PEI's have been determined by light scattering techniques.

Polyamines are polymers produced by the polymerization of amine monomers or by hydrolysis of polymers to amine functionality. In some embodiments, a polyamine is employed in an effective amount sufficient to result in a fast hardening aqueous coating composition of the present disclosure. In other words, the fast hardening aqueous coating composition of the present disclosure can include an amine-containing latex. Blends of both the polyimine and the polyamines can be employed in effective amounts sufficient to result in a fast hardening aqueous coating composition of the present disclosure.

As used herein, "amine-containing" latex refers to a latex having pendant amine functional groups. The amine-containing latexes may be prepared in accordance with any of a number of methods, including, but not limited to: addition polymerization of ethylenically unsaturated monomers containing amine-functionality; polymerization of monomers which readily generate amines by hydrolysis; reactions of aziridines with carboxyl-containing polymers; reactions of polymers containing an enolic carbonyl group (e.g., acetoacetoxyethyl methacrylate (AAEM), and diamines); reactions of amines with epoxy-containing polymers; and reactions of amine with polymers of vinyl benzyl chloride. Such polymerization reactions are known in the art, and examples of preparation of these and other suitable amine-containing latexes may be found in the following publications: U.S. Pat. No. 3,847,857 (Chou et al.); U.S. Pat. No. 4,119,600 (Bakule et al.); U.S. Pat. No. 5,364,891 (Pears et al.); U.S. Pat. No. 5,494,961 (Lavoie et al.); and U.S. Pat. No. 4,367,298.

For the various embodiments, the fast hardening aqueous coating composition may be prepared by mixing the polyimine and/or the polyamine with the anionically stabilized aqueous dispersion to which the volatile base has been added as discussed herein. This can be accomplished in a convenient manner, but addition of the polyimine and/or the polyamine as an aqueous solution, e.g., about 50 weight percent polyimine, is advantageous. The triazole can be added at a convenient point in the preparation of the composition. In one embodiment, the triazole can be added to the other components of the composition during the preparation of a paint, e.g. a traffic paint, that will contain the composition.

If desired, one or more conventional additives may be incorporated into the coating compositions of the present disclosure in order to modify the properties thereof. Examples of these additives include, but are not limited to, conventional thickeners, dispersants, pigments, dyes and/or colorants, biocides, anti-foaming agents, optical brighteners, wet strength agents, lubricants, water retention agents, crosslinking agents, surfactants, buffering agents, and the like. In one embodiment, the composition is in the form of a paint, and can be formulated according to methods known to those skilled in the art. Due to the surprisingly good plate out resistance properties imparted by the triazole, the composition of the present disclosure can be advantageously employed in fast-hardening traffic paint formulations.

Advantageously, the disclosed compositions can result in a Reduction In Plating of at least 10%, preferably at least about 25%, more preferably at least about 50%, and even more preferably at least about 75%. For the purposes of the present disclosure, the term "Reduction in Plating" refers to the degree of plate out reduction as calculated hereinbelow.

As mentioned herein, the composition of the present disclosure can be advantageously employed in applications where plate out onto metal-containing surfaces has been a problem. Examples of some of the more commonly used metals for industrial equipment, including, for example, tanks and plumbing, are stainless steel, carbon steel, copper, and aluminum. These and other types of metals often come in contact with latex or latex containing formulations during production, processing, storage or application. Steels are designated by grade, type and class. Grade is used to denote chemical composition; type is used to indicate deoxidation practice; and class is used to describe some other attribute such as strength level or surface smoothness. ASTM or ASME are the most widely used specifications for steel products in the United States; however, the grade, type and class terms are used somewhat interchangeably. Stainless steel is known for its outstanding corrosion resistance and is primarily an alloy of iron, chrome and nickel with very low carbon content. 18-8 is a generic designation that is used to indicate stainless steels such as 302, 303, 304, 305, 384 having compositions containing approximately 18% chrome and 8% nickel. 316 stainless steel is often the metal of choice for aqueous contact and is composed of 67.9% Fe, 17% Cr, 12% Ni, 3.0% Mo, and only 0.10% C by weight. Carbon steels have lower corrosion resistance than stainless with carbon contents in the range of about 0.3-1.1%. They also contain less than 1.65% Mn, 0.60% Si, and 0.60% Cu while alloy steels have greater levels of those three elements. Contrasted to these are wrought iron that contains 98.5% Fe with 1.5% C, and cast iron is with 97% Fe with 3% carbon.

Almost all carbon steel that is exposed to the external environment is either zinc plated or hot dip galvanized (also a zinc coating). Common grades of carbon steel that are zinc plated are Steel Grade 2 (low carbon steel), Steel Grade 5 (medium carbon steel) and Steel Grade 8 (medium carbon alloy steel). Because galvanized steel has a much thicker coating than zinc plated steel, galvanized steel is also more corrosion resistant.

Other metals that are occasionally used in exterior and some internal industrial applications include brass, bronze, silicon bronze, and aluminum. Brass and bronze are alloys of copper, but they also contain some zinc. A typical yellow brass composition is 67% Cu and 33% Zn, while naval brass is 60% Cu, 39% Zn and 1% Sn. Bronze is often used in marine applications and has greater strength and more corrosion resistance than brass. A typical salt water bronze composition is 45% Cu, 33% Ni, 16% Sn and 5.5% Zn.

Specific Embodiments

The following examples are given to illustrate the present disclosure and should not be construed as limiting in scope. All parts and percentages are by weight unless otherwise indicated.

Test Methods pH pH is measured on latexes and paints at room temperature using a Cole Farmer pH 100 Series pH meter with autotemperature compensation.

Brookfield Viscosity

This viscosity was measured on latexes and paints using a Brookfield DV-II+ digital viscometer (available from Brookfield Engineering Laboratories, Inc., Stoughton, Mass., USA). Viscosity determinations are made in either 20 ml scintillation vials or in ½ pint (0.237 liter) lined cans. The measurements are made at room temperature at an instrument speed of 30 rotations per minute (rpm) using the appropriate spindle providing torque readings between 10-100%.

Paint Consistency

This viscosity is measured according to ASTM D562 using a digital Brookfield Model KU-1 viscometer available from Brookfield Engineering. This instrument uses the same paddle spindle and rotation speed of a Stormer viscometer, and the viscosity readout is also in Krebs Units (KU). All measurements are made at 25° C. in a ½ pint (0.237 liter) can.

No-Pick-Up

This thy time measurement is run using ASTM D711. Draw-downs of the latex or paint are made on glass using a 10 mil gap film applicator. In this test, a timer is started, and a no-track wheel is rolled over the coating repeatedly at 1 minute intervals until the coating does not stick to the wheel. The number of minutes elapsed is recorded as the No-Pick-Up dry time.

Dry-to-Touch

This dry time measurement is conducted by making draw-downs of the latex or paint using a 3 mil gap film applicator on a sealed black Leneta chart. A timer is immediately started, and the dry time is determined by periodically touching a finger to the coating at 15 second intervals until there is no transfer of liquid and the surface is tack-free. The elapsed time is recorded as the 3 mil Dry-to-Touch time.

Latex Heat-Age Stability

This test is conducted by placing 2 ml of latex into a 3 ml vial with cap. The capped latex is then placed into an oven at 80° C. At one day intervals, the vial is removed, cooled to room temperature, and examined by rocking back and forth to determine if the contents are still fluid. The number of days to solidification is recorded as the Latex Heat Age Stability. The test is stopped at 14 days.

Paint Heat Age Stability—Method A

This test is conducted by placing 18 ml of latex paint into a 20 ml scintillation vial with cap. The vial with latex is placed into a 50° C. convection oven and removed at 24 hour intervals for examination. At each time interval, the sample is allowed to cool to room temperature, and then a Brookfield DV-II+ viscosity measurement is made using Spindle #4 at 30 rpm. The viscosity is plotted over time to provide a relative indication of the heat-age stability. If gellation of the sample occurs, the time to gellation is also recorded.

Paint Heat Age Stability—Method B

This method is conducted with the paint in ½ pint (0.237 liter) cans, leaving about 0.5 inch (1.27 centimeter) of free space at the top. The sealed paint can is placed in a oven at 50° C. and removed daily for examination. If the latex is gelled, the elapsed time in days is recorded as the Heat-Age-Stability. The cans are tested in this manner for up to 14 days.

Hardening Rate Measurement

The term "fast hardening aqueous coating composition" as used herein is defined as a composition wherein a cast film of the composition has a hardening rate measurement rating of at least 5 within 20 minutes after casting, measured at a temperature of 25° C. and relative humidity of 50 percent.

A film of the composition to be tested is cast on a glass surface with a 0.51 mm (20 mil) draw down bar. The hardening rate for the composition is then determined by finger testing of the drying films under ambient conditions of temperature of 25° C. and relative humidity of 50 percent. This test must be performed in still air. The composition is rated every 10 minutes on a rating scale of 1 to 8 as follows:

1. Wet composition, flows easily.
2. Skin over wet composition, skin is sticky.
3. Thick paste, composition does not flow.
4. Composition is slightly hard, very thick paste.
5. Composition is not sticky or wet, but is receptive to fingerprint with soft pressure, soft when twisted or gouged.
6. Composition is receptive to fingerprint only with firm pressure.
7. Composition is hard, is not receptive to fingerprint, is cloudy/white.
8. Composition is hard and clear.

Plate Out Test

A gravimetric method is used for determining the amount of latex plating that occurs when latex or a latex-containing composition is in contact with a metal surface. The test apparatus consists of a closed cell containing a weighed quantity of latex or paint. A weighed metal sample is then partially immersed in the latex in the closed cell for a set period of time. On removing the metal sample, the loss of wet latex or paint in the cell (Wet Plating) and the amount of dry latex or paint plating on the metal substrate (Dry Plating) are gravimetrically determined. The ratio of those two weights yields the average Plating Solids.

Commercial bolts or lag screws are used for the test metal substrates. They are a preferred test metal substrate because they have a large surface area per unit volume, are uniform in size and geometry, are easy to obtain, are low cost, require no preparation, have a threaded geometry that retains the plating, have geometry and size that allow small volumes of sample liquid for the test, and are available in a variety of metal types in a given geometry. Common threaded bolts and lag screws of 2 inch (5.08 centimeter) length and ¼ inch (0.635 centimeter) diameter are the standard test geometry. Full thread hex head tap bolts of zinc plated steel, hot dip galvanized steel, and solid bronze construction are used for most metal stability testing. As brass is not commonly available in a hex head configuration, full thread solid brass machine screws with slotted pan or flat heads are employed. The shaft of the brass machine screw is identical to the hex head bolts of the same diameter. The 2 inch (5.08 centimeter) tap bolts and machine screws have standard threads of 20 threads/inch for ¼ inch (0.635 centimeter) diameter. The common designation for this geometry is ¼ 20×2. Hex head lag bolts (often referred to as lag screws) of zinc steel and galvanized steel construction are also used for metal testing, and these are a preferred geometry for these metals. The 2 inch (5.08 centimeter) hex head lag screws of ¼ inch (0.635 centimeter) diameter have threads that are wider (10 threads/inch) and deeper than tap bolts. Unlike bolts, which have a relatively flat end, lag screws have a pointed end and are designed for anchoring into wood substrates.

The test cells for containing the test metals are glass 20 ml disposable scintillation vials with plastic caps. These cells are employed because they are large enough to contain the 2 inch (5.08 centimeter) test metals when capped, easy to seal, transparent, low in cost, inert, and readily available. The dimensions of these scintillation vials are 60 mm in height and 24 mm ID with a neck opening of 16 mm. Although these vials hold 20 ml when full, only 15 ml of liquid sample is used for each test for partial immersion of the bolts to a depth of 32 mm. With 15 ml of liquid sample in the scintillation vial, the immersion depth of a ¼ inch (0.635 centimeter) diameter bolt or screw is 32 mm. The bolt extends about 28 mm above the surface of the liquid with the head of the bolt or screw at the top residing just inside the vial neck for positioning and ease of removal.

The following is a detailed procedure for this method. All weighings are with an analytical balance to four decimal places.

1) Number and weigh ($W_{M1}$) a series of bolts or lag screws. The test metals are all from the same supplier and same lot for a given test series.
2) Inject 15.0 ml of sample liquid into each vial by syringe, and then cap the vial.
3) Weigh ($W_{VL1}$) each capped vial containing the 15 ml of latex or latex paint.
4) Place a matching numbered bolt or lag screw into each vial containing the latex or paint with the head up and the threaded end down. Recap the vial.
5) Allow the samples to sit undisturbed for the specified immersion time. The standard period is 24 hr.
6) At the end of the immersion period, carefully remove each bolt or lag screw with tweezers avoiding contact of the plated material with the neck or sides of the vial. Let any free latex drip back into the vial (usually only 1-3 drops), and then place the head of each bolt into a notched metal rack for drying. Recap the vial.
7) Weigh ($W_{VL2}$) each capped vial containing the remaining unplated latex or paint to determine the "Wet Plating" ($P_W$), where ($P_W$)=$W_{VL1}$-$W_{VL2}$.
8) After air drying the plated bolts for 1 hr., place the metal rack containing the bolts into an air circulating oven at 120° C. for 2 hr. Remove the metal rack from the oven, and allow the samples to cool to room temperature (approximately 15 minutes).
9) Weigh ($W_{M2}$) each plated bolt and then calculate "Dry Plating" ($P_D$), where $P_D$=$W_{M2}$-$W_{M1}$.

Dividing the Dry Plating ($P_D$) by the Wet Plating ($P_w$) gives the average "Plating solids" ($P_S$), where $P_S$=$P_D$/$P_W$*100%.

For plated paint samples, the bolts or screws are gently rinsed with deionized water immediately after removal from the vials. In this procedure, the bolt is removed from the cell with tweezers and then immersed in a container of deionized water. The bolt is gently swirled in the container three times and then removed and placed in a drying rack. This procedure removes any free paint that is not really plated. Latex or paint that is truly plated on metal becomes water insoluble and remains on the threads during rinsing. With mostly inert test metals such as high grades of stainless steel, it is typical to see very little or no latex or paint on the threads when the metal is removed from the vial. Gentle rinsing will typically remove latex that is not truly plated. Accordingly, the test is more meaningful when a plate out susceptible metal, such as zinc plated steel, is used for plate out testing.

Plating Reduction

The invention advantageously results in a reduction in plating on metals. When a composition is compared for plating with and without triazole, the "Plating Reduction" (PR) is calculated using the following formula for dry plating: % PR=($P_{DC}$-$P_{DT}$)/$P_{DC}$×100 where $P_{DC}$ is dry plating of the "control" composition (without triazole) and $P_{DT}$ is the dry plating for the composition with triazole.

Materials

The following materials are used in the examples.

Latexes: UCAR™ Latex DT211, UCAR™ Latex DT250, UCAR™ Latex DT400 (The Dow Chemical Company).

Triazoles: benzotriazole (ReagentPlus, 99%, Aldrich), 40% aqueous sodium benzotriazol, Wintrol B 40NA (Wincom Inc.), 50% aqueous sodium tolyltriazole, Wintrol T 50NA (Wincom Inc.), and ammonium benzotriazole. The ammonium benzotriazole is prepared by reacting the ReagentPlus benzotriazole with an excess of aqueous ammonia; it has a pH of 9.9 and is an aqueous solution having 25% solids.

Biocide: DOWICIL 75 (The Dow Chemical Company); Defoamer: DREW L-493 (Drew Chemical, Division of Ashland Chemical); Propylene Glycol (The Dow Chemical Company); Titanium Dioxide: TiPure R901 (DuPont); Dispersant: RHODIA 226/35 (Rhodia); Calcium Carbonate: OMYACARB 5 (Omya Corporation); Thickener: NATROSOL 250 HBR (Aqualon, Division of Hercules); Coalescing Aid: TEXANOL (Eastman Chemical)

| Test Paint Formula | | |
|---|---|---|
| Raw Material | Solids (%) | Charge (g) |
| Latex Binder | 50.5 | 515.3 |
| Dowcil 75 | 100.0 | 0.6 |
| Drew L-493 | 100.0 | 2.2 |
| Rhodia 226/35 | 35.0 | 8.5 |
| Propylene Glycol | 0.0 | 22.4 |
| 1% Natrosol 250HBR | 1.0 | 33.6 |
| Ti-Pure R-900 | 100.0 | 112.0 |
| Mix on disperser for 3 minutes | | |
| Omyacarb 5 | 100.0 | 890.5 |
| Mix on disperser for 4 minutes | | |
| Texanol | 0.0 | 23.5 |
| Drew L-493 | 100.0 | 3.4 |
| Total Charge | | 1612.0 |

The following Examples are illustrative of the process for incorporation of triazole and for testing of plating on metals using the Plate Out Test:

Example 1

Addition of Sodium Tolyltriazole to Latex and Testing for Plating on Zinc Plated Steel Into a 600 ml beaker is charged 400.0 g of 50% solids UCAR Latex DT250 with gentle mixing on a lab stirrer. 8.00 g of Wintrol T 50NA is added by syringe to the latex with stirring. The concentration of sodium tolyltriazole (NaTTA) is 1.0% active based on latex solids (ABOLS). The procedure is repeated using other triazole concentrations, as shown in Table 1.

A 3 mil wet drawdown of the latex with NaTTA is homogeneous and free of grit particles, similar to the same latex without NaTTA. 15 ml samples of the latex with and without NaTTA are evaluated using the Plate Out Test with zinc plated steel lag screws. After 24 hr, the lag screws are removed and compared gravimetrically for latex plating on the metal by drying the plated screws in a convection oven at 120° C. for 2 hr. The average thy plating on the screws without NaTTA is 1.004 g. The average dry plating on the screws with NaTTA is 0.481 g, which is a 52% reduction in plating relative to the control latex without NaTTA.

Examples 2-5

The procedure of Example 1 is repeated with other combinations of metal, triazole, and latex. The results are summarized in Table 1.

Example 6

Incorporation of Sodium Tolyltriazole (Natta) into Latex Paint and Testing for Plating on Metal A traffic paint is prepared by charging 350.0 g of the NaTTA latex of Example 1 into a 1000 ml stainless steel beaker with low mixing on a high-speed lab disperser. The following components are subsequently added with mixing: 0.4 g DOWICIL 75 biocide, 3.8 g DREW L-493 antifoam, 5.8 g RHODIA 226/375 pigment dispersant, 15.2 g propylene glycol, 23.1 g 1% NATROSOL 250HBR thickener solution, 76.1 g Ti-Pure R-900 titanium dioxide, 604.9 g OMYACARB 5 calcium carbonate extender, and 16.0 g TEXANOL coalescing aid. The resulting paint is mixed for 5 minutes at high speed to maintain a moderate vortex. When cooled to room temperature, the paint has a Stormer KU viscosity of 85KU and pH of 10.6. Another paint is prepared in an identical fashion using the same lot of DT250 latex without NaTTA added. 15 ml samples of the paint with and without NaTTA are evaluated using the Plate Out Test with zinc plated steel lag screws. The dry plating on the screw without NaTTA is 5.21 g. The dry plating on the screw with NaTTA is 0.72 g. The reduction in plating with NaTTA relative to the control paint is 86.2%.

Examples 7-30

The procedure of Example 6 is repeated subject to various changes, which are shown in Table 1 along with the results of testing. The results are summarized in Table 1.

The data in Table 1 illustrate the dry plating ($P_D$) amounts obtained at up to four triazole concentrations and the % plating reduction (PR) obtained at 1.0% triazole "active based on latex solids" (ABOLS) concentration in the latex or latex paint. The variables in this table include variation in latex type, latex lots, latex paint type, latex paint lot, type of metal, and type of triazole added where BTA=benzotriazole, AmBTA=ammonium benzotriazole, NaBTA=sodium benzotriazole, NaTTA=sodium tolyltriazole, ZPS=zinc plated steel, and HDGS=hot dipped galvanized steel.

TABLE 1

| Example No. | Latex | Metal | Additive | Additive Conc. (% ABOLS) | | | | % Plating Reduction at 1.0% Additive Conc. |
|---|---|---|---|---|---|---|---|---|
| | | | | 0* | 0.5 | 1.0 | 1.5 | |
| | | | | Dry Plating (g) | | | | |
| 1 | DT250 | ZPS | NaTTA | 1.00 | — | 0.48 | — | 52.0 |
| 2 | DT250 | ZPS | BTA | 0.71 | 0.30 | 0.17 | 0.12 | 76.1 |

TABLE 1-continued

| Example No. | Latex | Metal | Additive | Additive Conc. (% ABOLS) | | | | % Plating Reduction at 1.0% Additive Conc. |
| --- | --- | --- | --- | --- | --- | --- | --- | --- |
| | | | | 0* | 0.5 | 1.0 | 1.5 | |
| | | | | Dry Plating (g) | | | | |
| 3 | DT250 | Brass | BTA | 0.46 | 0.11 | 0.11 | 0.11 | 76.1 |
| 4 | DT211 | HDGS | NaTTA | 0.29 | 0.09 | 0.10 | 0.05 | 65.5 |
| 5 | DT250 | HDGS | NaTTA | 0.29 | 0.09 | 0.03 | — | 89.7 |
| 6 | DT250 | ZPS | NaTTA | 5.21 | — | 0.72 | — | 86.2 |
| 7 | DT250 | Brass | BTA | 1.40 | 0.60 | 0.60 | 0.60 | 57.1 |
| 8 | DT250 | ZPS | AmBTA | 5.20 | 2.80 | 1.70 | 1.70 | 67.3 |
| 9 | DT250 | ZPS | NaBTA | 5.20 | 3.00 | 1.70 | 2.00 | 67.3 |
| 10 | DT250 | ZPS | NaBTA | 4.84 | — | 1.38 | — | 71.5 |
| 11 | DT250 | ZPS | NaBTA | 4.20 | 1.90 | 0.70 | 0.70 | 83.3 |
| 12 | DT250 | ZPS | NaBTA | 4.70 | — | 1.70 | — | 63.8 |
| 13 | DT250 | ZPS | NaBTA | 6.20 | — | 1.70 | — | 72.6 |
| 14 | DT250 | ZPS | NaBTA | 6.20 | 4.00 | 2.50 | — | 59.7 |
| 15 | DT250 | ZPS | NaTTA | 6.20 | 3.90 | 2.00 | — | 67.7 |
| 16 | DT250 | Brass | NaTTA | 0.88 | 0.28 | 0.10 | 0.11 | 88.6 |
| 17 | DT250 | Brass | NaBTA | 0.88 | 0.30 | 0.09 | 0.11 | 89.8 |
| 18 | DT250 | ZPS | NaTTA | 5.80 | 4.10 | 2.40 | — | 58.6 |
| 19 | DT211 | ZPS | NaTTA | 3.60 | — | 2.20 | — | 38.9 |
| 20 | DT250 | ZPS | NaTTA | 5.40 | — | 3.00 | — | 44.4 |
| 21 | DT211 | Brass | NaTTA | 1.46 | — | 0.11 | — | 92.5 |
| 22 | DT211 | ZPS | NaTTA | 5.22 | — | 0.48 | — | 90.8 |
| 23 | DT211 | HDGS | NaTTA | 4.88 | — | 1.81 | — | 62.9 |
| 24 | DT250 | Brass | NaTTA | 1.10 | — | 0.23 | — | 79.1 |
| 25 | DT250 | ZPS | BTA | 4.20 | 1.90 | 1.00 | 1.10 | 76.2 |
| 26 | DT250 | HDGS | NaTTA | 4.22 | — | 1.67 | — | 60.4 |
| 27 | DT250 | ZPS | NaTTA | 4.20 | — | 2.80 | — | 33.3 |
| 28 | DT250 | ZPS | NaTTA | 4.9 | — | 1.3 | — | 73.5 |
| 29 | DT250 | ZPS | NaTTA | 4.9 | — | 1.8 | — | 63.3 |
| 30 | DT250 | ZPS | NaTTA | 4.67 | — | 1.42 | — | 69.6 |

*Not an embodiment of the disclosure.

Examples 31-39

In another investigation of paint plating on metals, commercial samples of waterborne traffic paints are obtained from the Texas Department of Transportation (TxDOT), Materials and Pavement Section, Construction Materials Division, Austin, Tex. These are samples from commercial production batches of paint made by traffic paint producers and sent to the Texas DOT lab for road striping qualification. In the table below, two different paint suppliers are represented with both white and yellow traffic paints, and the fast-dry latex in those paints are specified as either Fastrack HD-21A or UCAR Latex DT400. The amount of latex solids in each paint as specified by TxDOT is 16.1% by weight based on total wet paint. Each paint sample is divided into two containers. To one container, sodium tolyltriazole is added at a concentration of 1.0% active based on latex solids (ABOLS) in the paint. The paints with and without sodium tolyltriazole are evaluated using the Plate Out Test, and the results are shown in Table 2.

TABLE 2

| Example No. | Paint Supplier | Production Lot | Paint Color | Dry Plating on ZPS (g) | | % Dry Plating Reduction |
| --- | --- | --- | --- | --- | --- | --- |
| | | | | Supplied Paint* | Paint With 1.0% NaTTA (ABOLS) | |
| 31 | Lab | — | Yellow | 2.442 | 1.028 | 57.9 |
| 32 | A | 1 | Yellow | 3.517 | 0.729 | 79.3 |
| 33 | A | 2 | Yellow | 3.578 | 0.674 | 81.2 |
| 34 | A | 3 | White | 4.349 | 0.661 | 84.8 |
| 35 | A | 4 | White | 4.016 | 0.660 | 83.6 |
| 36 | B | 1 | Yellow | 0.582 | 0.082 | 86.0 |
| 37 | B | 2 | Yellow | 0.410 | 0.045 | 89.0 |
| 38 | B | 3 | White | 0.877 | 0.074 | 91.6 |
| 39 | B | 4 | White | 1.066 | 0.075 | 93.0 |

*Not an embodiment of the disclosure.

The complete disclosures of all patents, patent applications including provisional patent applications, publications, and electronically available material cited herein or in the documents incorporated herein by reference. The foregoing detailed description and examples have been provided for clarity of understanding only. No unnecessary limitations are to be understood therefrom. The embodiments of the disclosure are not limited to the exact details shown and described; many variations will be apparent to one skilled in the art and are intended to be included within the disclosure defined by the claims.

What is claimed is:

1. A fast hardening aqueous coating composition comprising: an anionically stabilized aqueous dispersion of a copolymer, the copolymer having in polymerized form a polymerization mixture containing two or more ethylenically unsaturated monomers wherein, based on the total weight of all ethylenically unsaturated monomers in the polymerization mixture, from 0 to about 4 weight percent of the monomers are alpha, beta-ethylenically unsaturated aliphatic carboxylic acid monomers; an effective amount of a polyimine or a polyamine; an effective amount of a volatile base; and from about 0.01 to about 5 weight parts of a triazole selected from the group consisting of benzotriazole, salts of benzotriazole, tolyltriazole, salts of tolyltriazole and mixtures thereof, based on 100 weight parts solids of the copolymer; and wherein the composition has a pH of at least about 8.

2. The composition of claim 1, wherein the polyimine has a molecular weight of from about 250 to about 20,000.

3. The composition of claim 1, wherein the triazole is present in an amount from about 0.1 to about 3 weight parts, based on 100 weight parts of latex polymer solids.

4. The composition of claim 1, wherein the triazole is present in an amount from about 0.25 to about 1.5 weight parts, based on 100 weight parts of latex polymer solids.

5. The composition of claim 1, wherein the triazole comprises tolyltriazole.

6. The composition of claim 1, wherein the triazole comprises benzotriazole.

7. The composition of claim 1, wherein the triazole comprises at least one alkali metal triazole salt.

8. The composition of claim 7, wherein the triazole comprises sodium tolyltriazole.

9. The composition of claim 7, wherein the triazole comprises sodium benzotriazole.

10. The composition of claim 1, wherein the triazole comprises ammonium benzotriazole, ammonium tolyltriazole, or both.

11. The composition of claim 1, wherein the amount of triazole is sufficient to result in a Plating Reduction of at least about 10% measured using a zinc plated steel lag screw.

12. The composition of claim 1, wherein the polyimine comprises polyethyleneimine.

13. The composition of claim 1, wherein the copolymer has a Tg of from about −10° C. to about 50° C.

14. The composition of claim 1, wherein the effective amount of the polyimine includes from about 0.2 to about 5 weight parts, based on 100 weight parts solids of the copolymer of the anionically stabilized aqueous emulsion, of the polyimine.

15. The composition of claim 1, wherein the effective amount of the volatile base includes from about 0.2 to about 5 weight parts, based on 100 weight parts solids of the copolymer of the anionically stabilized aqueous emulsion, of the volatile base.

16. A method of preparing the composition of claim 1, comprising:
preparing the anionically stabilized aqueous dispersion of the copolymer by polymerization of the two or more ethylenically unsaturated monomers; adding the volatile base to the anionically stabilized aqueous dispersion of the copolymer to adjust a pH of the anionically stabilized aqueous dispersion; adding the polyimine or the polyamine to the pH adjusted anionically stabilized aqueous dispersion; and adding the triazole to prepare the composition.

17. A method of modifying a traffic paint, comprising: adding sodium tolyltriazole to the traffic paint at a concentration of 1.0% active based on latex solids in the traffic paint.

18. The composition of claim 1, wherein a cast film of the composition has a hardening rate measurement rating of at least five within 20 minutes after casting, measured at 25° C. and at a relative humidity of 50%.

* * * * *